US011488262B1

(12) United States Patent
Nichols et al.

(10) Patent No.: US 11,488,262 B1
(45) Date of Patent: *Nov. 1, 2022

(54) USER INTERFACE FOR TRACKING DEPOSITS AND EXPENSES

(71) Applicant: Wells Fargo Bank, N.A., San Francisco, CA (US)

(72) Inventors: Tambra Nichols, Charlotte, NC (US); Daniel Sanford, Charlotte, NC (US); Akiva D. Kates, Charlotte, NC (US); Laura B. Yeager, Charlotte, NC (US); Christopher J. Williams, Mooresville, NC (US); Hampton B. Castleberry, Harrisburg, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,369

(22) Filed: Aug. 7, 2020

Related U.S. Application Data

(63) Continuation of application No. 15/868,781, filed on Jan. 11, 2018, now Pat. No. 10,769,730.

(51) Int. Cl.
*G06Q 40/00* (2012.01)
*G06Q 40/02* (2012.01)
(Continued)

(52) U.S. Cl.
CPC ......... *G06Q 40/128* (2013.12); *G06F 3/0486* (2013.01); *G06Q 40/02* (2013.01); *G06T 11/60* (2013.01)

(58) Field of Classification Search
CPC .... G06Q 40/128; G06Q 40/02; G06F 3/0486; G06T 11/60
See application file for complete search history.

(56) References Cited

U.S. PATENT DOCUMENTS 8,229,806 B1 * 7/2012 Chapman ............... G06Q 40/00
705/30
8,682,754 B1 * 3/2014 Chapman ............... G06Q 40/12
705/30
(Continued)

FOREIGN PATENT DOCUMENTS

CN 104881800 A 9/2015

OTHER PUBLICATIONS

Shahed Anzarus Sabab et al, Sep. 1, 2018, 2018 4th International Conference on Electrical Engineering and Information & Communication Technology (iCEEiCT) (pp. 136-141).*
(Continued)

*Primary Examiner* — Talia F Crawley
(74) *Attorney, Agent, or Firm* — Schwegman Lundberg & Woessner, P.A.

(57) ABSTRACT

Various examples are directed to systems and methods for interfacing a computing system to a human user. For example, a graphical user interface may be provided to a user. The graphical user interface comprises a holding shape and a first income source shape indicating a first income source. The holding shape comprises a filled portion having a first filled portion level indicating a first holding balance of an account of the user. A first deposit shape may be moved from the first income source shape towards the filled portion of the holding shape. The first deposit shape may indicate a first deposit to the account from the first income source. The filled portion may be resized to a second filled portion level indicating a second holding balance of the account after the first deposit.

15 Claims, 12 Drawing Sheets

(51) Int. Cl.
*G06F 3/0486* (2013.01)
*G06T 11/60* (2006.01)

(56) References Cited

U.S. PATENT DOCUMENTS

| | | | |
|---|---|---|---|
| 9,916,620 B2* | 3/2018 | Del Vecchio | G06Q 40/02 |
| 2004/0044722 A1 | 3/2004 | Epshteyn | |
| 2007/0067297 A1 | 3/2007 | Kublickis | |
| 2014/0095217 A1 | 4/2014 | Armstrong et al. | |
| 2015/0379488 A1* | 12/2015 | Ruff | G06Q 40/06 705/40 |
| 2016/0048793 A1 | 2/2016 | Lamb | |
| 2016/0104113 A1 | 4/2016 | Gorlin | |
| 2017/0069036 A1 | 3/2017 | Shaaban et al. | |
| 2017/0178117 A1 | 6/2017 | Mcclard et al. | |
| 2017/0195182 A1 | 7/2017 | Nair | |
| 2019/0213690 A1 | 7/2019 | Nichols et al. | |

OTHER PUBLICATIONS

Redefining the Geography of Space, Time, and Money (English)J Christopher Westland et al.,Jan. 1, 1999,MIT Press 1999, : Global Electronic Commerce: Theory and Case Studies.*
J. F. Brown et al.,Jan. 1, 1973,: IBM Systems Journal (vol. 12, Issue: 2, pp. 172-186),Interactive simulation for banking.*
"U.S. Appl. No. 15/868,781, Non Final Office Action dated Oct. 18, 2019", 10 pgs.
"U.S. Appl. No. 15/868,781, Notice of Allowance dated May 7, 2020", 9 pgs.
"U.S. Appl. No. 15/868,781, Response filed Jan. 21, 2020 to Non Final Office Action dated Oct. 18, 2019", 8 pgs.
U.S. Appl. No. 15/868,781, filed Jan. 11, 2018, User Interface for Tracking Deposits and Expenses.

* cited by examiner

|  | EXPENSE DESIGNATION | | | | |
|---|---|---|---|---|---|
|  | INCOME A | INCOME B | INCOME C | INCOME D | |
| 1ST EXPENSE | ☐ | ☐ | ☐ | ☐ | ☐ |
| 2ND EXPENSE | ☐ | ☐ | ☐ | ☐ | ☐ |
| 3RD EXPENSE | ☐ | ☐ | ☐ | ☐ | ☐ |
| 4TH EXPENSE | ☐ | ☐ | ☐ | ☐ | ☐ |
| HOLDING BALANCE | ☐ | ☐ | ☐ | ☐ | ☐ |

USER INTERFACE FOR TRACKING DEPOSITS AND EXPENSES

CROSS-REFERENCE TO RELATED APPLICATION

This application is a continuation of U.S. patent application Ser. No. 15/868,781, filed Jan. 11, 2018, which is incorporated by reference herein in its entirety.

TECHNICAL FIELD

Embodiments described herein generally relate to systems and methods for interfacing a computing device or system of computing devices to a human user. For example, embodiments described herein are directed to systems and methods for generating and/or serving a user interface for tracking deposits and expenses.

BACKGROUND

Computing technology permits the processing and management of large quantities of data at high speed. In the context of financial management, computing devices and systems of computing devices are capable of processing deposits, expenses, and other financial variables for users. The capabilities of computing technology, however, cannot be put to their best use unless the user is able to clearly understand the underlying processing.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

FIG. 9 is a diagram showing one example of a screen that may be part of the UI of FIGS. 7 and 8 to allow the user to allocate deposits from different income sources to different expenses.

DETAILED DESCRIPTION

Figure 1:
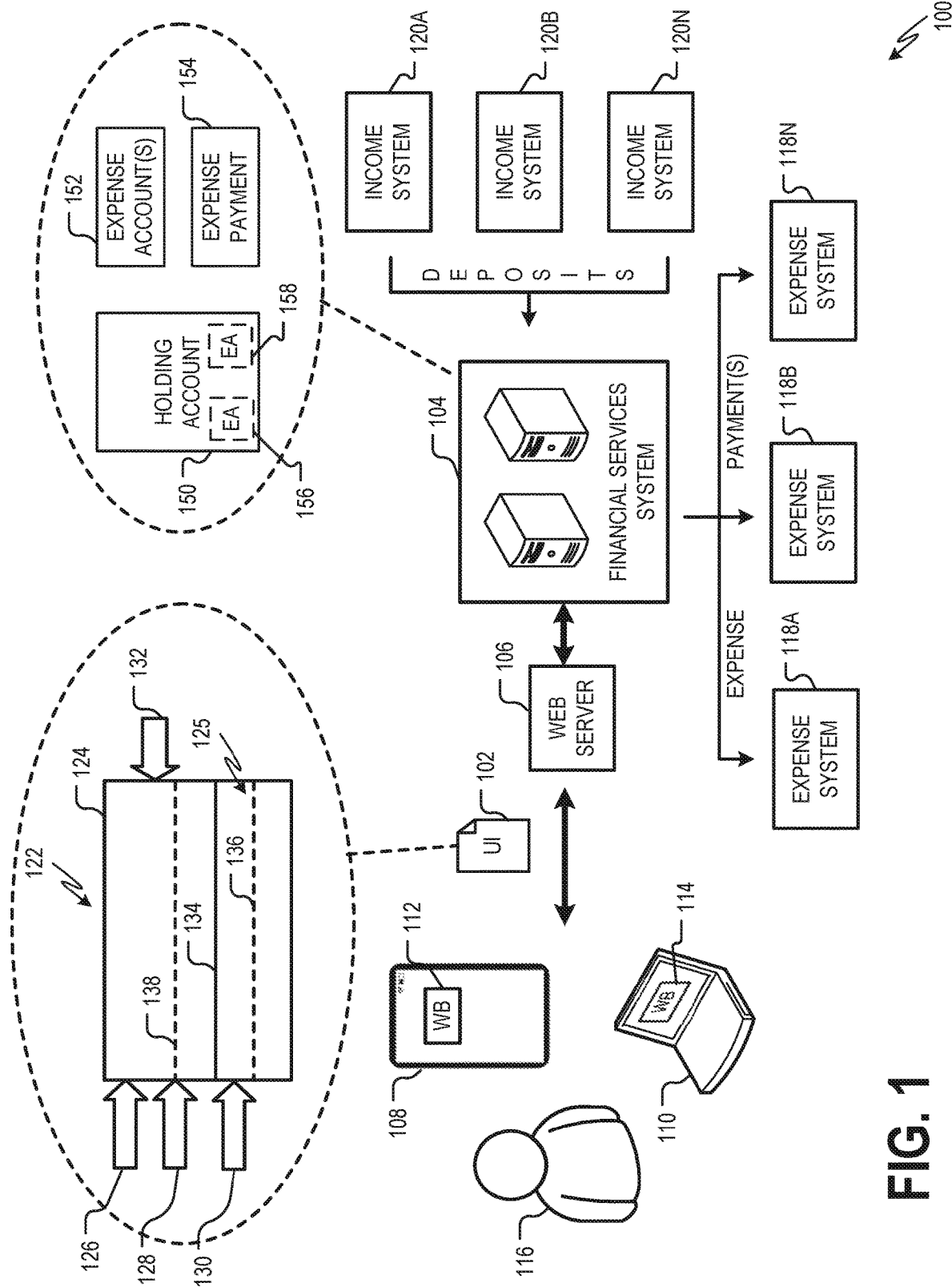
FIG. 1 is a diagram showing one example of an environment for interfacing between a computing device and a user to track deposits and expenses.

Various examples are directed to systems and methods for interfacing a computing device or system of computing devices to a human user. A computing device generates a user interface that may be served to the human user. The user interface may be configured to provide the user with rich information regarding the processing of the computing device, for example, as it relates to deposits to a financial account and user expenses.

In some examples, the user interface described herein is served to users who earn some or all of their income as an independent contractor. Such users participate in what is sometimes called the "gig economy." Independent contractor users can receive income either directly from customers or from an intermediary, such as, for example, a home rental service, such as Airbnb, Inc., a ride-sharing service, such as Lyn, etc. Unlike standard employees, an independent contractor typically has to cover a number of business-related expenses from their income. For example, whereas an employer typically withholds taxes from an employee's salary, an independent contractor user is responsible for paying his or her own taxes. Also, independent contractors are also often responsible for business expenses such as gasoline, capital asset acquisition, capital asset maintenance, raw materials, etc. Because of this, independent contractor users have a need to track their expenses and income. For example if an independent contractor user spends too much money in a month or doesn't work a sufficient amount, the independent contractor user may be unable to make necessary payments without undue hardship.

Computing devices are capable of tracking user income and expenses to the penny. For example, a computing device may receive expense data describing the user's expenses as well as income data describing deposits (e.g., income deposits) to one or more user accounts. It does a user no good, however, for his computing device to determine how much more the user should save for taxes or how much the user must earn during a budget period to cover expenses if that information is not presented to the user in an accessible way.

Accordingly, the systems and methods described herein include a user interface that provides the user with a graphical representation of income and expenses. For example, the graphical user interface includes a holding shape. The holding shape has a filled portion. The size of the filled portion indicates a holding balance of an account of the user. In some examples, the size of the filled portion is described by a level, where the level is a divider between the filled portion and the remainder of the holding shape. When the filled portion gets bigger, the level may "rise" (e.g., from bottom to top, from left-to-right, etc.). When the filled portion gets smaller, the level may "fall."

The holding balance may indicate the full balance of the user's account and/or a balance that remains after expenses are met. As the user receives income, the filled portion gets larger, causing the holding shape to "fill up" and the filled portion level to rise.

The user interface also includes one or more income source shapes. Each income source shape represents a type of income for the user. For example, if the user rents a house with a real estate sharing service such as Airbnb, Inc., and also works odd jobs as a handyman, a first income shape may represent income received from the real estate sharing service. A second income shape may represent income from the handyman odd jobs.

When a deposit is made to the user's account, the user interface "fills up" the holding shape by moving a deposit shape from its corresponding income source shape to the filled portion of the holding shape. For example, an animation may be displayed illustrating the deposit shape being moved from its corresponding income source shape to the filled portion of the holding shape. In some examples, this also causes the level of the filled portion to rise. In some examples, the deposit shape resembles a drop or drops of liquid, a stream, etc., resembling something being poured from the income source shape to the holding shape. After the deposit shape is moved to the holding shape, the holding shape filled portion may be resized to a new level indicating a new holding balance after the deposit.

User expenses may be indicated at the user interface in one or more of several different ways. Some examples use an expense balance indicator for one or more expenses. For example, an expense balance indicator may by positioned to indicate a level of the filled portion that corresponds to a holding balance sufficient to cover the expense. The expense balance indicator may include a line, arrow, or other indicator on or adjacent to the holding shape. Some examples use expense shapes for one or more expenses. An expense shape is positioned near the holding shape. In some examples, when all or part of a deposit is allocated to an expense, all or a portion of a deposit shape is moved directly to the deposit shape. In other examples, an expense shape is positioned at a level of the holding shape such that when the level of the filled portion extends above that level, the holding shape "overflows" into the expense shape (e.g., until the expense shape is filled).

The various examples for generating and serving a graphical user interface to a user described herein may provide the user with a way to quickly and easily understand how much income the user needs to make to meet expenses and how much money the user has remaining.

FIG. 1 is a diagram showing one example of an environment 100 for interfacing between a computing device and a user to track deposits and expenses. The environment 100 includes a graphical user interface (UI) 102 that is served to one or more user computing devices 108, 110 by a web server 106. The user computing devices 108, 110 may be any suitable computing device or devices such as, for example, a smart phone, a tablet computer, a laptop computer, a smart watch, etc. User computing devices 108, 110 may comprise a display for showing the UI 102 to a user 116. In some examples, user computing devices 108, 110 execute a web browser application 112, 114. The web browser application 112, 114 may communicate with the web server 106 to receive the UI 102 and display the UI 102 at a screen or other display of the user computing device 108, 110. Although two user computing devices 108, 110 are shown in FIG. 1, in some examples, the user 116 receives the UI 102 at a single user computing device (e.g., one of 108 or 110). In some examples, the user 116 receives the UI 102 at different user computing devices 108, 110 at different times.

The environment 100 also includes a financial services system 104. The financial services system 104 includes one or more computing devices that may be at a common geographic location or may be distributed across multiple geographic applications. The financial services system 104 may receive data regarding one or more accounts held by the user 116, for example, as described herein. The UI 102 may be generated by any suitable combination of the financial services system 104, the web server 106, and the user computing device 108, 110. Also, in some examples, the web server 106 is omitted and the user computing device 108, 110 is served the UI 102 directly by the financial services system 104.

The financial services system 104 receives descriptions of one or more deposits to an account of the user 116 from one or more income systems 120A, 120B, 120N. Income systems 120A-120N may represent sources of income to the user 116 such as, for example, a bank system, payroll system, or other system associated with a company for which the user 116 is an independent contractor; a bank system, payroll system, or other system associated with a customer of the user 116, etc.

In some examples, the financial services system 104 also provides and/or requests expense payments to one or more expense systems 118A, 1189, 118N. Expense systems 118A, 118B, 118N may include any systems associated with an expense. For example, an expense system 118A, 118B, 118N may include a bank system associated with an account for the user 116 where the user 116 may save money for meeting an expense. Also, an expense system 118A, 118B, 118N may include a system through which payments on the expense are made. For example, an expense system 118A, 118B, 118N associated with the Internal Revenue Service may receive expense payments associated with federal taxes. An expense system 118A, 118B, 118N associated with an insurance company may receive expense payments associated with automobile, homeowners, or other relevant insurance.

The financial services system 104 receives data regarding one or more accounts 150, 152 held by the user 116. Accounts 150, 152 may be any suitable type of financial account such as, for example, demand deposit accounts, savings accounts, etc. Accounts 150, 152 may be used to hold funds received by deposit from one or more of the income systems 120A, 120B, 120N. A holding account 150 may receive deposited funds. In some examples, portions of the holding account 150 are allocated to cover certain expenses. For example, expense allocations 156, 158 represent portions of the holding account 150 that are allocated to particular expenses.

In addition to or instead of allocating portions of the holding account 150 to expenses, some examples utilize one or more expense accounts 152. Funds allocated to an expense may be moved to the expense account 152, for example, by the financial services system 104. In some examples, different expenses have dedicated expense accounts 152. Also, in some examples, in addition to or instead of allocating portions of the holding account 150 to expenses, the financial services system 104 may direct one or more expense payments 154, for example, to an appropriate expense system 118A, 118B, 118N. Expense payments 154 may be made upon receipt of a deposit and/or periodically (e.g., quarterly, monthly, weekly, daily, etc.).

Figure 3:
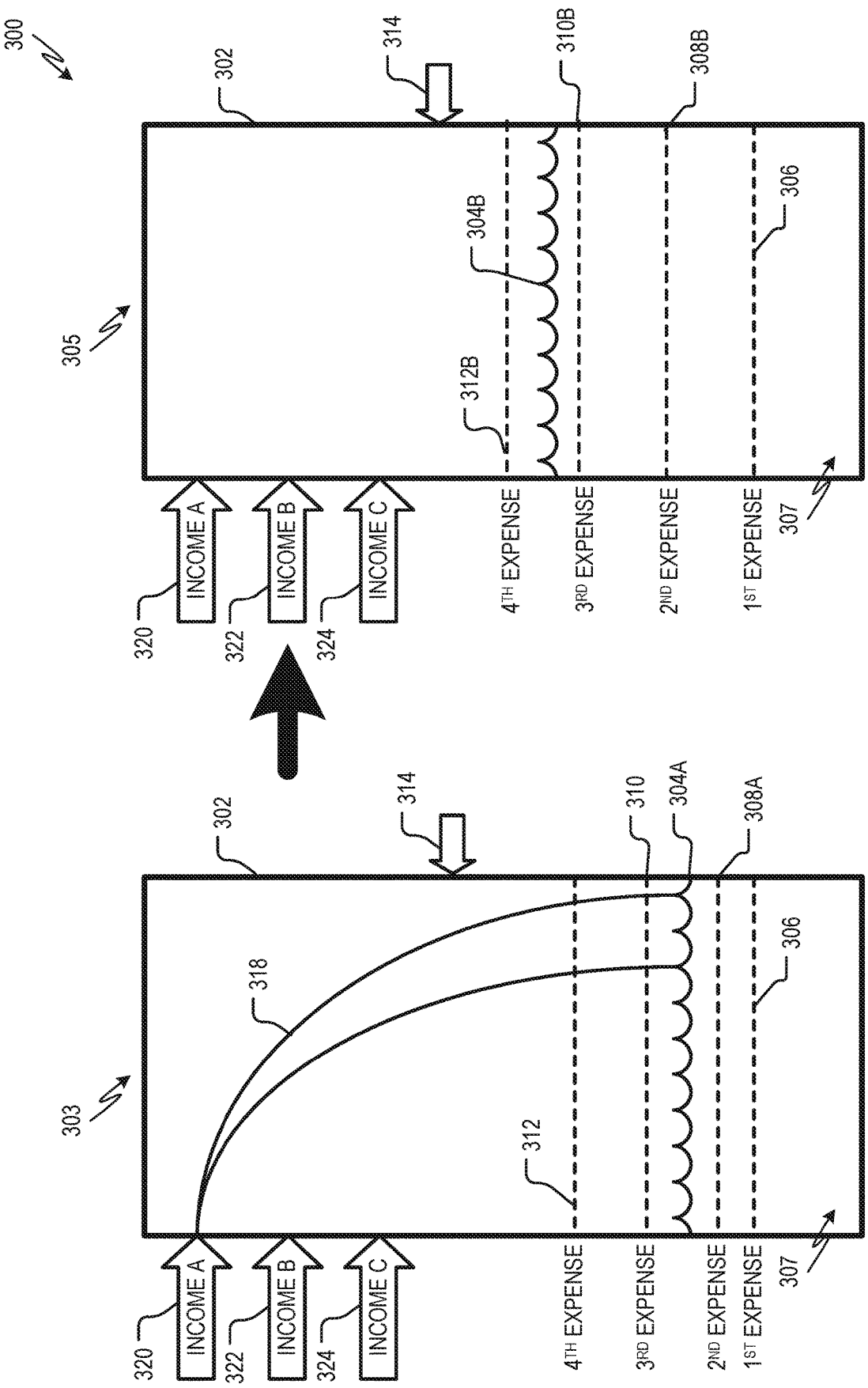
FIG. 3 is a diagram showing example screens of the user interface (UI) described herein.
Figure 5:
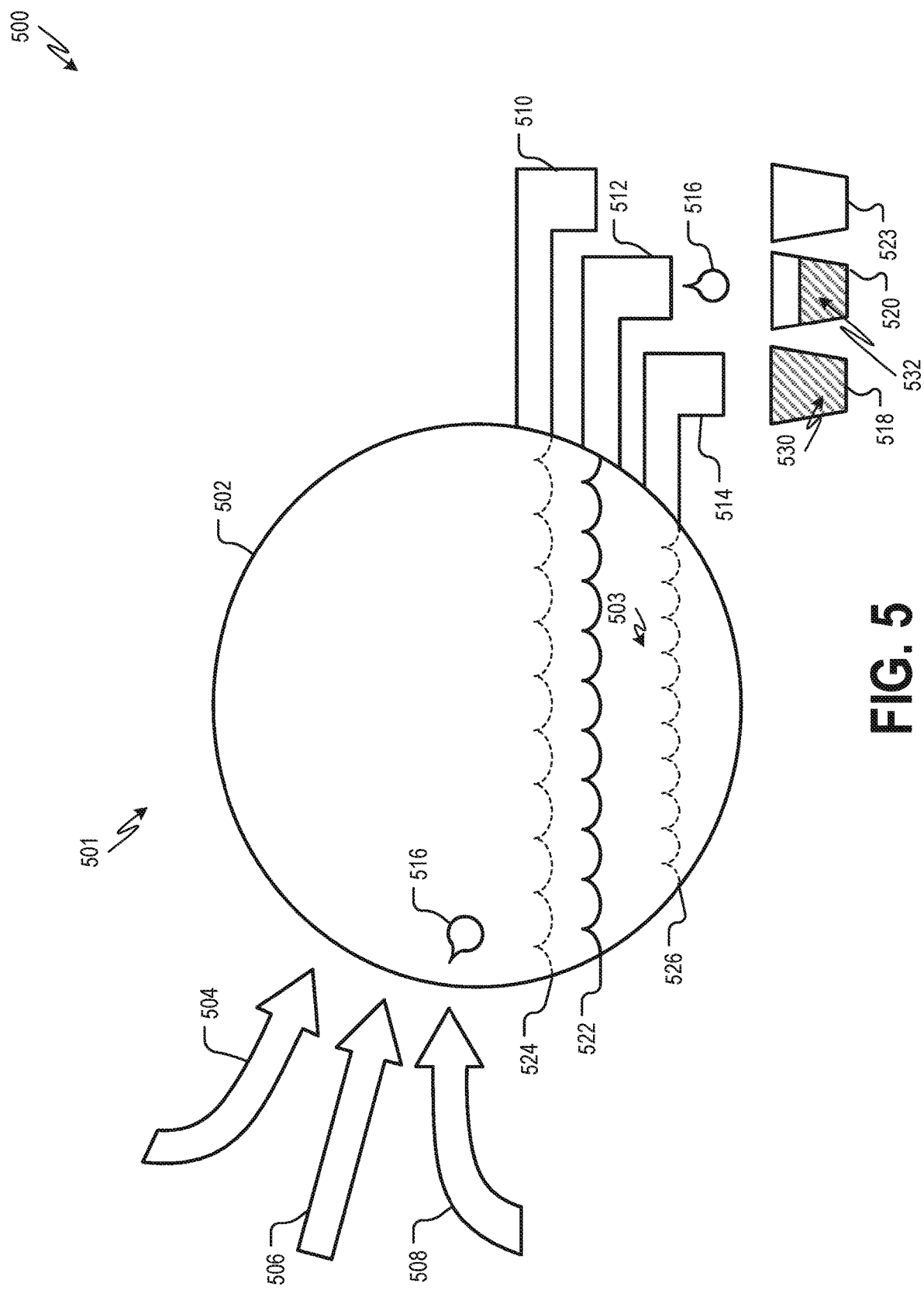
FIG. 5 is a diagram showing an example screen of a UI.
Figure 7:
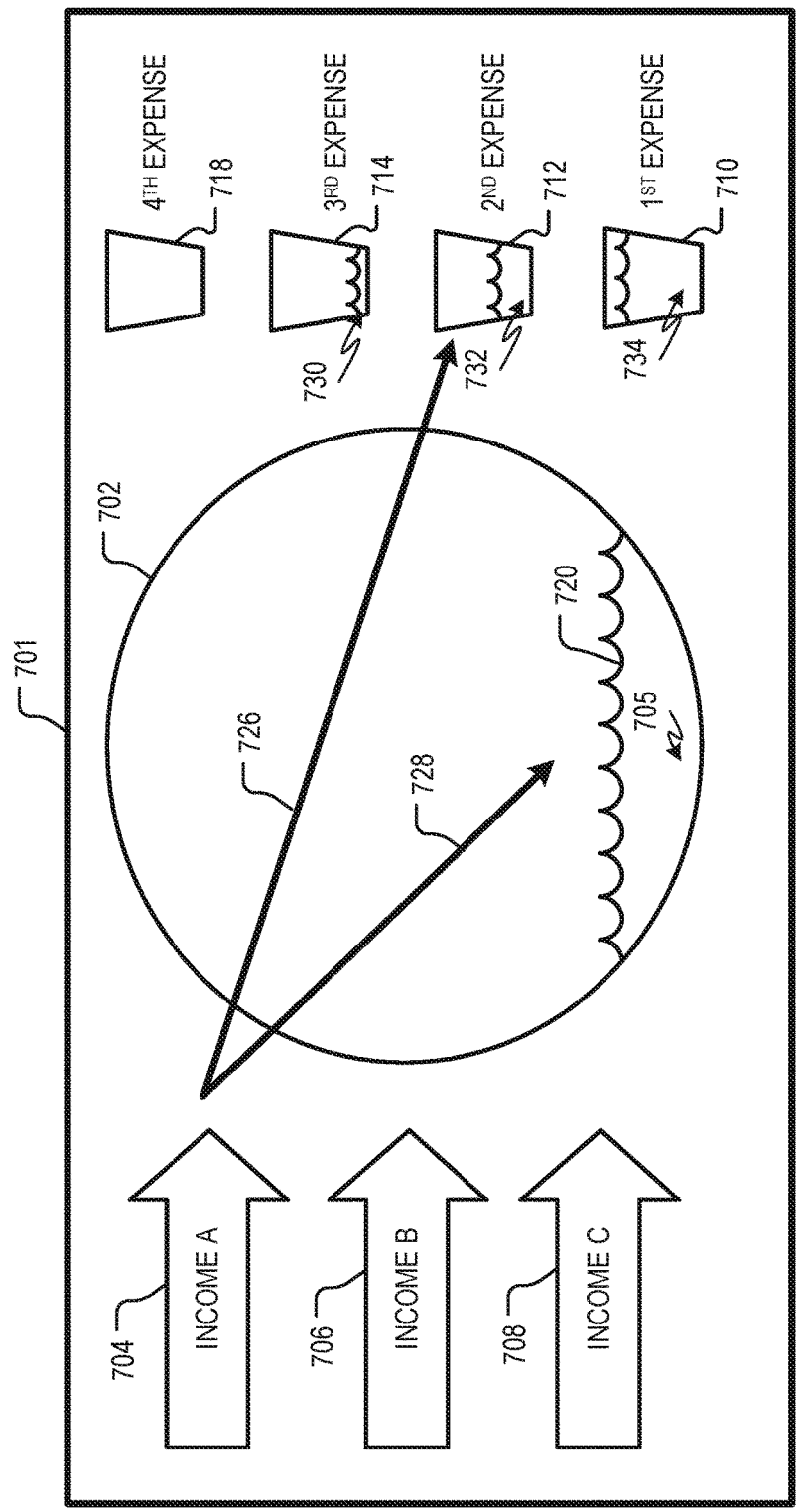
FIG. 7 is a diagram showing an example screen of a UI.
Figure 8:
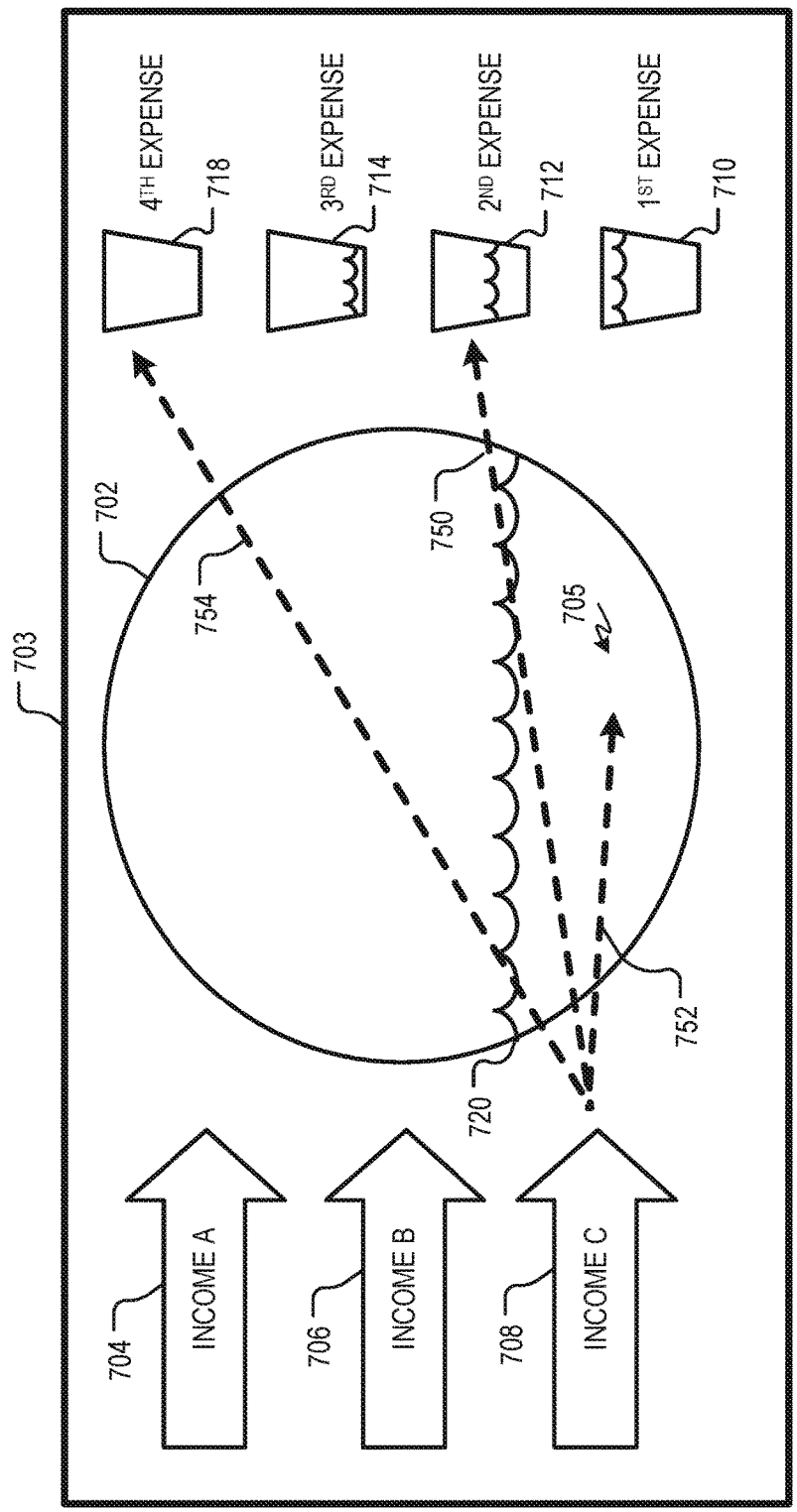
FIG. 8 is a diagram showing another example screen of the UI of FIG. 7.

Funds held at the account 150 and/or accounts 150, 152 may be described by a holding balance. The holding balance is a balance of deposits received (e.g., over a period such as a month). The holding balance excludes funds that have been paid to an expense system 118A, 118B, 118N. Funds that have been allocated to a particular expense, but not yet paid, can be included in the holding balance or excluded from the holding balance. For example, FIGS. 1 and 3 show examples of the UI 102 in which the holding balance includes funds allocated to different expenses. On the other hand, FIGS. 5, 7 and 8 show examples of the UI in which funds allocated to different expenses are excluded from the holding balance and instead indicated in one or more expense shapes.

The holding balance, in some examples, is independent of the way in which the accounts 150, 152 are structured. For example, if the holding account 150 includes one or more expense allocations 156, 158 allocated to expenses, the expense allocations 156, 158 may be considered part of the holding balance or excluded from the holding balance, depending on the arrangement of the UI 102. Also, in some examples, if one or more expense accounts 152 are present, the balances of the expense accounts 152 may be considered part of the holding balance or excluded from the holding balance, depending on the arrangement of the UI 102.

FIG. 1 also depicts an example screen 122 from the UI 102. The screen 122 shows a holding shape 124 with a filled portion 125 including portions of the holding shape 124 below a fill line 134, where the position of the fill line 134 indicates the level of the filled portion 125. In the example of FIG. 1, higher levels of the filled portion 125 correspond to higher positions of the fill line 134, although the holding shape 124 may be arranged in a different orientation in some examples. In the example screen 122, the filled portion 125 of the holding shape 124 indicates a holding balance that includes funds allocated to expenses.

Three example income source shapes 126, 128, 130 are shown in FIG. 1, although any suitable number of income sources and associated income source shapes may be shown. The screen 122 also includes two expense balance indicators 136, 138, indicated by dashed lines. For example, an expense balance indicator 136 corresponds to a holding balance that is lower than that indicated by the current level of the fill line 134. This indicates that the user 116 has already received sufficient income to cover the expense corresponding to the expense balance indicator 136. An expense balance indicator 138 is positioned above the current level of the fill line 134. This indicates that the user 116 needs additional income to cover the expense associated with the expense balance indicator 138.

Expenses indicated by the expense balance indicators 136, 138 may be determined in any suitable manner. In some examples, the financial services system 104 is programmed to automatically determine and plot expenses, for example, based on income received. For example, if the user 116 receives a deposit from an income source that is associated with independent contractor work, the financial services system 104 may determine that the user 116 is to pay certain expenses, such as payroll tax, income tax, etc., and may automatically generate expense balance indicators 136, 138 for those expenses. In some examples, when the financial services system 104 receives an indication that a deposit has been made, it prompts the user 116 to provide information regarding one or more expenses associated with the deposit or its income source. Also, in some examples, the user 116 may provide expenses. User-provided expenses may be business-related expenses (e.g., tax expenses, insurance expenses, car payment/maintenance expenses). User-provided expenses, in some examples, also include personal expenses such as, for example, expenses associated with a vacation or other desired purchase, expenses associated with a savings goal, etc.

In the example screen 122, the level of the filled portion 125 of the holding shape 124 indicates a holding balance that includes amounts allocated to expenses, indicated by expense balance indicators 136, 138. In some examples, if the user 116 and/or the financial services system 104 makes an expense payment 154 on one or more of the expenses indicated by expense balance indicators 136, 138, the payment may be deducted from the holding balance. Accordingly, the filled portion 125 may be re-sized to a smaller size. Also, the expense balance indicator 136, 138 corresponding to the expense may be moved to a lower level.

The screen 122 also includes a target level indicator 132. The target level indicator 132 indicates a target holding balance for the user 116. The target holding balance may indicate a level of income for the user 116 that allows the user 116 to meet all expenses while also having a selected amount left over. In the example of FIG. 1, the target level indicator 132 is above the current level of the fill line 134, indicating that the user 116 should earn additional income to meet the target holding balance. In some examples, the UI 102 is organized by period. For example, the UI 102 may show income and expenses from a certain period (e.g., a month, a quarter, a year, etc.). In some examples, the target level indicator 132 is also adjusted when expense payments 154 are made, for example, to a lower level.

Figure 2:
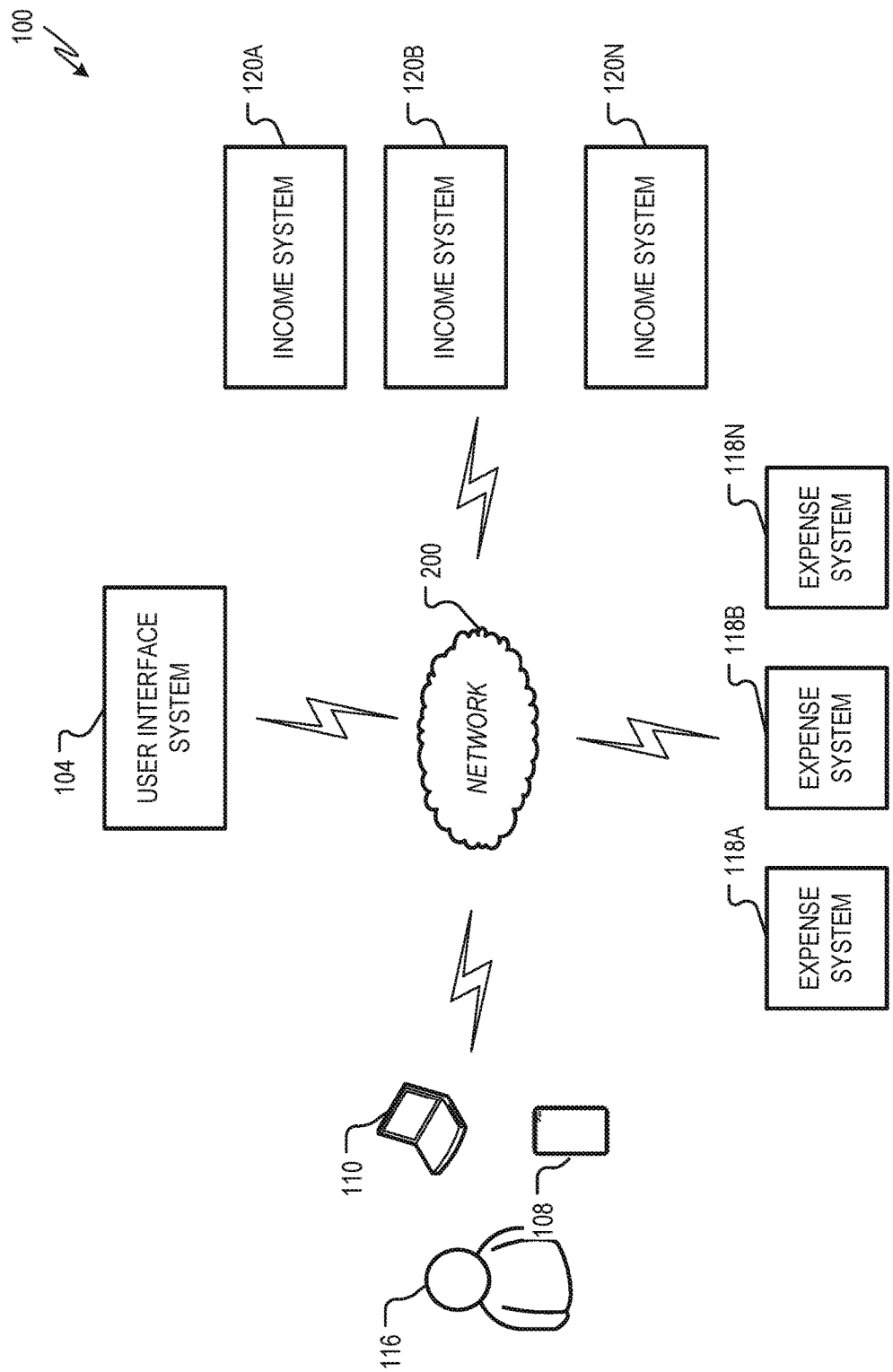
FIG. 2 is a diagram showing another example of the environment of FIG. 1 including additional details.

FIG. 2 is a diagram showing another example of the environment 100 including additional details. In the example of FIG. 2, the user computing devices 108, 110, the financial services system 104, the expense systems 118A, 118B, 118N, and the income systems 120A, 120B, 120N are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks, etc.

FIG. 3 is a diagram showing example screens 303, 305 of a UI 300. For example, the web server 106 may serve the screen 303 to indicate a deposit being made from an income source. The web server 106 may serve the screen 305 (e.g., after serving the screen 303) to show results of the deposit.

Referring to the screen 303, a holding shape 302 is shown with a filled portion 307 up to a fill line 304A indicating the level of the filled portion 307 at the screen 303. Three example income source shapes 320, 322, 324 are shown. Expense balance level indicators 306, 308A, 310, 312 are shown to illustrate four different expenses. In the example of FIG. 3, the expenses are stacked. For example, the holding balance is first allocated to the first expense until the filled portion level, indicated by the fill line 304A, reaches the first expense balance level indicator 306. After that, the holding balance is allocated to the second expense until the filled portion, indicated by the fill line 304A, reaches the second expense balance level indicator 308A, and so on. In an example where expenses are stacked, it may be the case that expenses lower on the "stack" are to be met first. For example, expenses related to taxes, insurance, car payments, etc., that cannot be easily postponed may be stacked below expenses such as vacations, etc., that can be deferred.

The screen 303 also shows an example deposit shape 318 being moved from the income source shape 320 to the filled portion 307 of the holding shape 302. In this example, the deposit shape 318 resembles a stream of liquid, sand, or another suitable substance being "poured" to the filled portion 307 of the holding shape 302. For example, the screen 303 may be animated to indicate the motion of the deposit shape 318. Referring now to screen 305, after the deposit shape 318 is moved to the filled portion 307 of the holding shape 302, the filled portion 307 is raised to a higher filled portion level in view of the deposit, indicated by the fill line 304B.

The example of FIG. 3 also shows an example of an expense (e.g., $2^{nd}$ expense) that is correlated to income. The amount necessary to cover some expenses increases as additional income is received. For example, payroll and other tax expenses are often a percentage of income. Accordingly, as more income is received, the amount necessary to cover those expenses increases. Also, some business-related expenses increase as more work is done. For example, raw material costs to produce a product increase as more products are produced. Also, for example, a user 116 working at a ride-sharing service spends more money on gasoline, car wear and tear, etc., for each ride given.

To account for variable expenses, the financial services system 104 modifies the levels of the expense balance level indicators 308B, 310B 312B. For example, the $2^{nd}$ expense, corresponding to the expense balance level indicators 308A, 308B, is a variable expense that increases in view of the deposit indicated by the deposit shape 318. Accordingly, the level of the expense balance level indicator 308A from screen 303 is increased, as shown by the expense balance level indicator 308B in screen 305. Because the expenses are stacked, expenses coming after the $2^{nd}$ expense (e.g., the $3^{rd}$ expense and the $4^{th}$ expense) also have their balances increased, indicated by expense balance level indicators 310B, 312B.

In some examples, the target level indicator 314 may also be raised to a higher level in view of the changes to the expense balance indicators for the $2^{nd}$, $3^{rd}$, and $4^{th}$ expenses. In other examples, the target level indicator 314 is initially positioned at a level that would cover expenses, including increases in expenses as more income is received.

Figure 4:
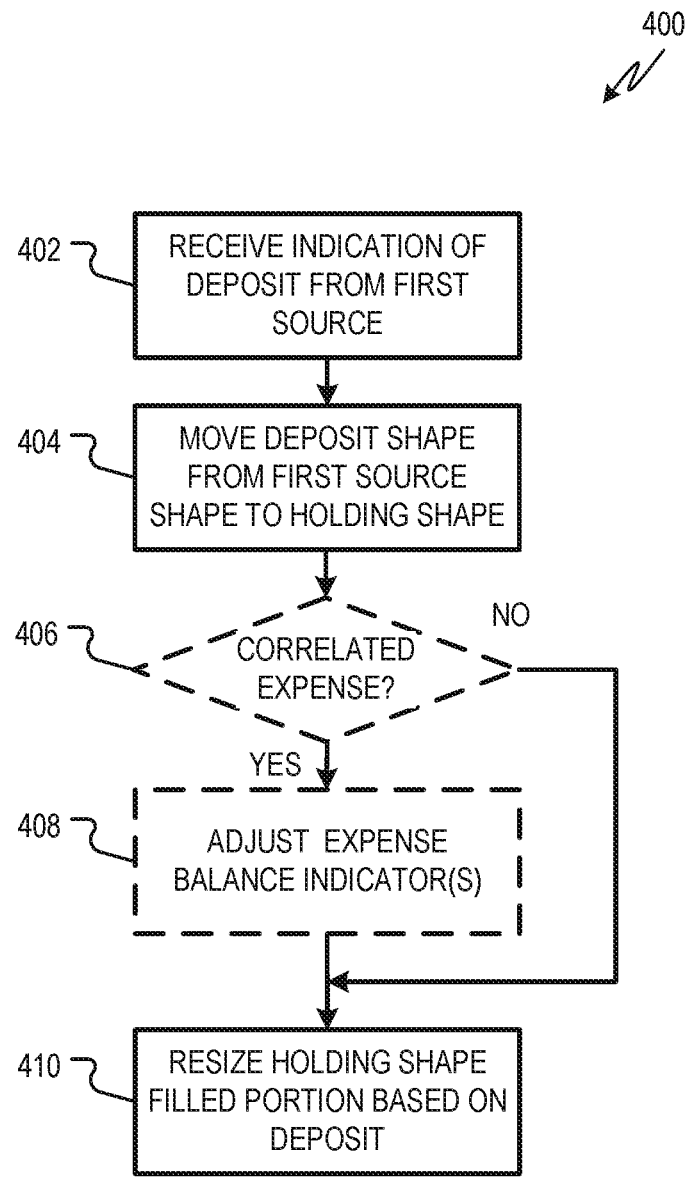
FIG. 4 is a flowchart showing one example of a process flow for modifying the UI of FIG. 3 to indicate a deposit.

FIG. 4 is a flowchart showing one example of a process flow 400 for modifying the UI 102 to indicate a deposit. The process flow 400 is described as being performed by the financial services system 104, although in some examples some or all of the process flow 400 is executed by the web server 106 and/or the user computing devices 108, 110.

At operation 402, the financial services system 104 receives data describing a deposit to the user's account from an income system 120A, 120B, 120N. The deposit is income to the user 116, for example, from work as an independent contractor. At operation 404, the financial services system 104 moves a deposit shape from an income source shape associated with the deposit to the filled portion of the holding shape.

At optional operation 406, the financial services system 104 determines if the there are any expenses correlated to the deposit. If yes, then, at optional operation 408, the financial services system 104 adjusts an expense balance indicator of an expense correlated to the deposit to indicate a new expense balance level. If more than one expense is correlated to the deposit, then the financial services system 104 may adjust expense balance indicators for each expense correlated to the deposit. Also, if expense balance indicators are stacked, as shown in FIG. 3, expense balance indicators for some non-correlated expenses may also be adjusted.

If optional operations 406 and 408 are omitted, after operation 408, and/or if there are no expenses correlated to the deposit, the financial services system 104 may resize the filled portion based on the deposit at operation 410. For example, the deposit may increase the holding balance of the account. The size of the filled portion may increase by an amount proportional to the size of the deposit to indicate the new holding balance. In some examples where expense shapes are used (FIGS. 5, 7, 8, etc.) the holding balance may not increase by the full amount of the deposit, if at all. For example, portions of the deposit allocated to an expense with an expense shape may be indicated at that expense shape.

FIG. 5 is a diagram showing an example screen 501 of a UI 500. For example, the web server 106 may serve the screen 501 to a user computing device 108, 110 to indicate a deposit being made from an income source. The screen 501 includes a holding shape 502 with a filled portion 503 at a level indicated by a fill line 522. Income source shapes 504, 506, 508 are also shown. A deposit shape 516 is shown moving from the income source shape 508 towards the filled portion 503.

The screen 501 also includes expense shapes 514, 518, 512, 520, 510, 523. In the example of FIG. 5, funds allocated to expenses are shown in the expense shapes. For example, in FIG. 5, the holding balance, indicated by the level of the filled portion 503 of the holding shape 502, excludes funds that are specifically allocated to an expense. Instead, funds that are specifically allocated to an expense are indicated by the filled portions 530, 532 of expense shapes 518, 520, 523. (Referring to FIG. 1, the funds allocated to expenses may be expense allocations 156, 158 at a holding account 150 and/or may be part of one or more separate expense accounts 152.)

Expense shapes 510, 512, 514 are shown adjacent to the holding shape 502 at different expense start levels. The expense start level of an expense shape 510, 512, 514 is the level at which the filled portion 503 of the holding shape 502 begins to over flow into the expense shape. In terms of funds, the expense start level of an expense shape indicates a holding balance at which funds from the holding balance begin to be reserved for the expense. In FIG. 5, for example, the expense shape 514 has an expense start level indicated by dashed fill line 526 and the expense shape 510 has an expense start level indicated by the dashed fill line 524.

In the example of FIG. 5, expense shapes 510, 512, 514 are associated with auxiliary expense shapes 518, 520, 523. As funds are allocated to an expense, the auxiliary expense shapes 518, 520, 523 are "filled" (e.g., the filled portions 530, 532 are raised to a higher level). For example, an expense deposit shape 516 may be moved from expense shape 512 to auxiliary expense shape 520 to indicate funds being allocated to the corresponding expense.

When an auxiliary expense shape 518, 520, 523 is filled (e.g., the filled portion 530, 532 takes up the entirety of the shape 518, 520, 523), further allocations to the expense may cease. This may allow the level of the filled portion 503 to continue to rise as more deposits are received, which may eventually fill the next expense.

Figure 6:
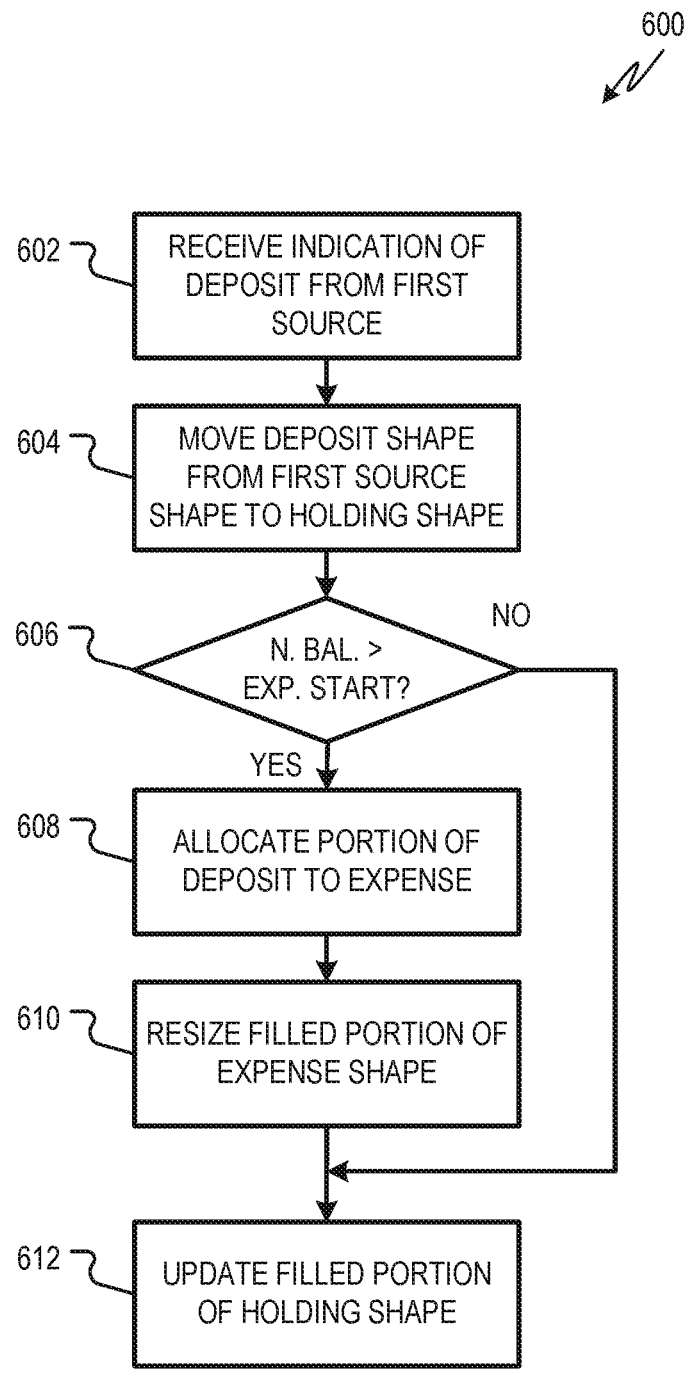
FIG. 6 is a flowchart showing one example of a process flow for modifying the UI of FIG. 5 to indicate a deposit.

FIG. 6 is a flowchart showing one example of a process flow 600 for modifying the UI 500 of FIG. 5 to indicate a deposit. The process flow 600 is described as being performed by the financial services system 104, although in some examples, some or all of the process flow 600 is executed by the web server 106 and/or the user computing devices 108, 110.

At operation 602, the financial services system 104 receives an indication of a deposit from a first deposit source, such as an income system 120A, 120B, 120N. At operation 604, the financial services system 104 moves a deposit shape, such as deposit shape 516, from a first income source shape associated with the deposit towards a filled portion 503 of the holding shape 502. At operation 606, the financial services system 104 determines if a new holding balance (including the deposit) would be greater than a next expense start level. If not, the financial services system 104 re-sizes the filled portion 503 of the holding shape to a new level indicating the deposit at operation 612.

If the new holding balance would be greater than the next expense start level, then, at operation 608, the financial services system 104 allocates at least a portion of the deposit to the expense indicated by the next expense start level. At operation 610, the financial services system 104 resizes a filled portion of the expense shape. If any of the deposit remains after the expense shape is filled, the financial services system 104 resizes the filled portion 307 at operation 612.

For example, in FIG. 5, prior to the deposit indicated by the deposit shape 516, the fill line 522 was below the expense start level indicated by the expense shape 512. The deposit increased the level of the filled portion 503 until the fill line 522 extended above the next expense start level indicated by the expense shape 512. Accordingly, holding balance represented above the expense start level is allocated to the expense shapes 512 and 520 until the filled portion 532 of the expense shape 520 is filled. If any of the deposit is left, the filled portion 503 is re-sized to a new level indicating the remainder.

FIG. 7 is a diagram showing an example screen 701 of a UI 700. For example, the web server 106 may serve the screen 701 to a user computing device 108, 110 to indicate a deposit being made from an income source. The screen 701 includes a holding shape 702 with a filled portion 705. A level of the filled portion 705 is indicated by a fill line 720. Income source shapes 704, 706, 708 are also shown along with expense shapes 710, 712, 714, 718 corresponding, respectively, to first, second, third, and fourth expenses. The expense shapes 710, 712, 714 include filled portions 730, 732, 734 indicating the expense balances.

In the example of FIG. 7, a deposit from income source shape 704 includes two deposit shapes 726, 728, indicating that portions of the deposit are allocated to different locations. Here, a first deposit shape 728 is moved towards the filled portion 705 of the holding shape 702 and represents a portion of the deposit allocated to the holding balance. Another deposit shape 726 is directed towards the second expense shape 712 and indicates a portion of the deposit allocated to the second expense. After the deposit, the filled portion 705 of the holding shape 702 may be re-sized to a new level considering the portion of the deposit allocated to the holding balance, and the filled portion 732 of the second expense shape may be re-sized to a new level considering the portion of the deposit allocated to the second expense.

FIG. 8 is a diagram showing another example screen 703 of the UT 700 of FIG. 7. In this screen 703, a second deposit is received from the income source indicated by income source shape 708. Three deposit shapes 750, 752, 754 are shown indicating that portions of the deposit are allocated to three different locations. A first deposit shape 752 is moved towards the filled portion 705 of the holding shape 702 and indicates a portion of the deposit allocated to the holding balance. A second deposit shape 750 is moved towards the second expense shape 712 and indicates a portion of the deposit allocated to the second expense. A third deposit shape 754 is moved towards the fourth expense shape 718 and indicates a portion of the deposit allocated to the fourth expense.

FIG. 9 is a diagram showing one example of a screen 900 that may be part of the UI 700 of FIGS. 7 and 8 to allow the user 116 to allocate deposits from different income sources to different expenses. In the screen 900, columns indicate income sources and rows indicate places where deposits from the respective income sources may be allocated. The user 116 may enter portions indicators (such as percentages) into the boxes to indicate the portion of deposits from each income source that is to be allocated to the different expenses and holding balance.

Figure 10:
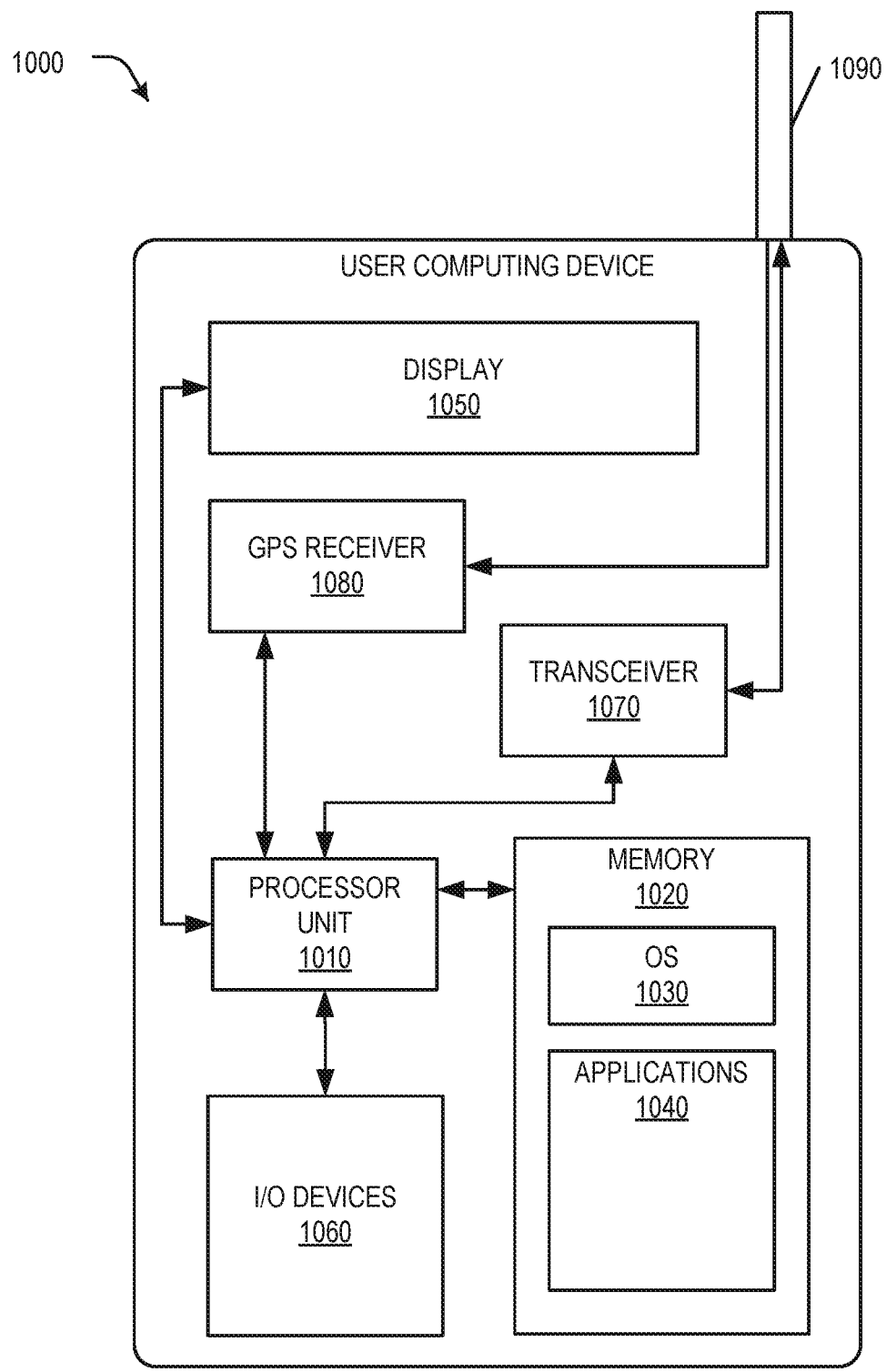
FIG. 10 is a block diagram showing an example architecture of a user computing device.

FIG. 10 is a block diagram showing an example architecture 1000 of a user computing device. The architecture 1000 may, for example, describe any of the computing devices described herein, including, for example, the user computing devices 108, 110, the web server 106, the financial services system 104, expense systems 118A, 118B, 118N, income systems 120A, 120B, 120N, etc. The architecture 1000 comprises a processor unit 1010. The processor unit 1010 may include one or more processors. Any of a variety of different types of commercially available processors suitable for computing devices may be used (for example, an XScale architecture microprocessor, a Microprocessor without Interlocked Pipeline Stages (MIPS) architecture processor, or another type of processor). A memory 1020, such as a Random Access Memory (RAM), a flash memory, or another type of memory or data storage, is typically accessible to the processor unit 1010. The memory 1020 may be adapted to store an operating system (OS) 1030, as well as application programs 1040.

The processor unit 1010 may be coupled, either directly or via appropriate intermediary hardware, to a display 1050 and to one or more input/output (I/O) devices 1060, such as a keypad, a touch panel sensor, a microphone, and the like. Such I/O devices 1060 may include a touch sensor for capturing fingerprint data, a camera for capturing one or more images of the user, a retina scanner, or any other suitable devices. The I/O devices 1060 may be used to implement I/O channels, as described herein. In some examples, the I/O devices 1060 may also include sensors.

Similarly, in some examples, the processor unit 1010 may be coupled to a transceiver 1070 that interfaces with an antenna 1090. The transceiver 1070 may be configured to both transmit and receive cellular network signals, wireless data signals, or other types of signals via the antenna 1090, depending on the nature of the computing device implemented by the architecture 1000. Although one transceiver 1070 is shown, in some examples, the architecture 1000 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a Global Positioning System (GPS) receiver 1080 may also make use of the antenna 1090 to receive GPS signals. In addition to or instead of the GPS receiver 1080, any suitable location-determining sensor may be included and/or used, including, for example, a Wi-Fi positioning system. In some examples, the architecture 1000 (e.g., the processor unit 1010) may also support a hardware interrupt. In response to a hardware interrupt, the processor unit 1010 may pause its processing and execute an interrupt service routine (ISR).

Figure 11:
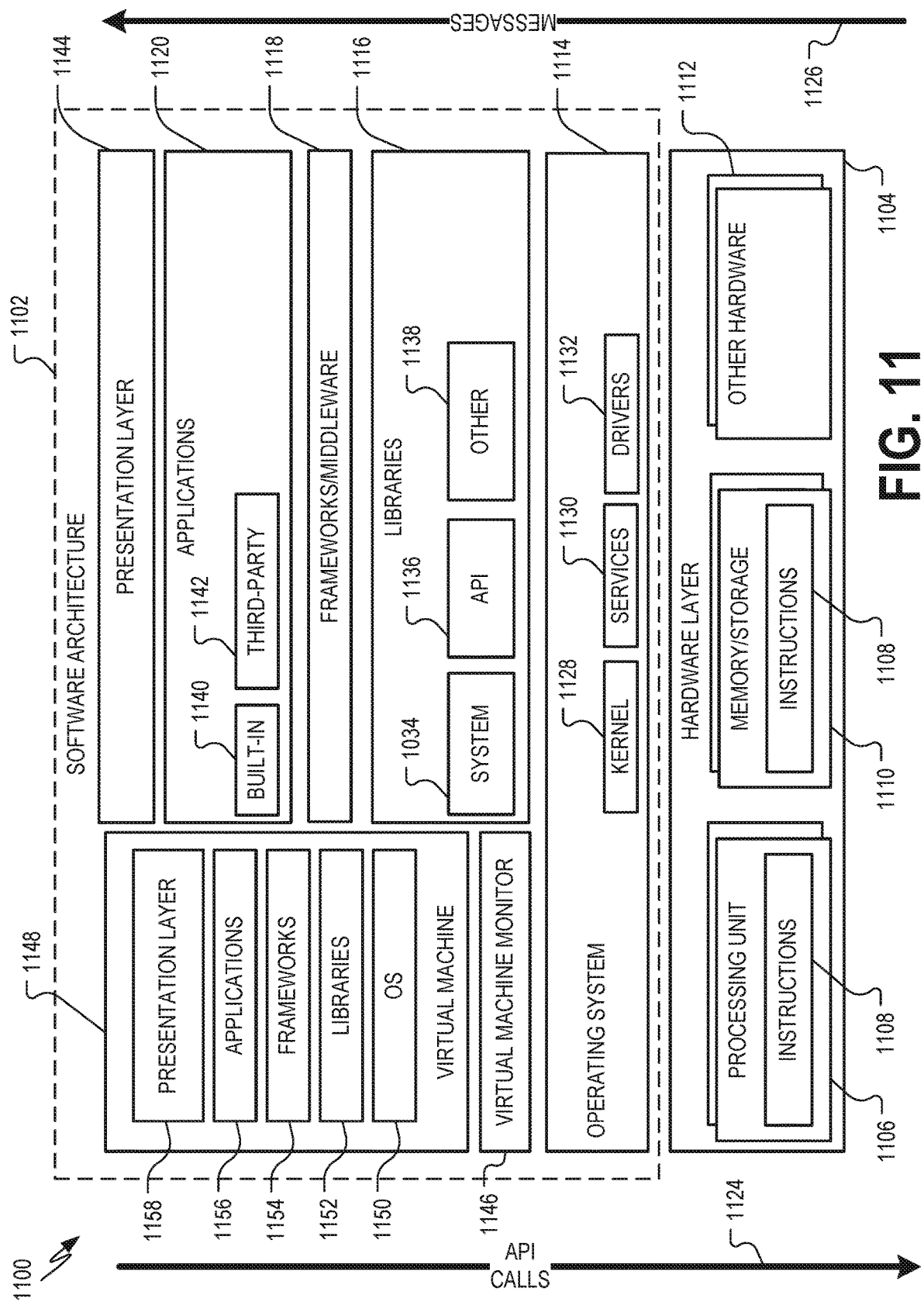
FIG. 11 is a block diagram showing one example of a software architecture for a computing device.

FIG. 11 is a block diagram 1100 showing one example of a software architecture 1102 for a computing device. The software architecture 1102 may be used in conjunction with various hardware architectures, for example, as described herein. FIG. 11 is merely a non-limiting example of a software architecture 1102, and many other architectures may be implemented to facilitate the functionality described herein. A representative hardware layer 1104 is illustrated and can represent, for example, any of the above-referenced computing devices. In some examples, the hardware layer 1104 may be implemented according to an architecture 1200 of FIG. 12 and/or the architecture 1000 of FIG. 10.

The representative hardware layer 1104 comprises one or more processing units 1106 having associated executable instructions 1108. The executable instructions 1108 represent the executable instructions of the software architecture 1102, including implementation of the methods, modules, components, and so forth of FIGS. 1-9. The hardware layer 1104 also includes memory and/or storage modules 1110, which also have the executable instructions 1108. The hardware layer 1104 may also comprise other hardware 1112, which represents any other hardware of the hardware layer 1104, such as the other hardware illustrated as part of the architecture 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special-purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of a hardware or software interrupt and, in response, cause the software architecture 1102 to pause its current processing and execute an ISR when an interrupt is received. The ISR may generate an alert.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphical user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. The third-party applications 1142 may include any of the built-in applications 1140 as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™ Windows® Phone, or other computing device operating systems. In this example, the third-party application 1142 may invoke the API calls 1124 provided by the mobile operating system such as the operating system 1114 to facilitate functionality described herein.

The applications 1120 may utilize built-in operating system functions (e.g., kernel 1128, services 1130, and/or drivers 1132), libraries (e.g., system libraries 1134, API libraries 1136, and other libraries 1138), or frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 11, this is illustrated by a virtual machine 1148. A virtual machine creates a software environment where applications/modules can execute as if they were executing on a hardware computing device. The virtual machine 1148 is hosted by a host operating system (e.g., the operating system 1114) and typically, although not always, has a virtual machine monitor 1146, which manages the operation of the virtual machine 1148 as well as the interface with the host operating system (e.g., the operating system 1114). A software architecture executes within the virtual machine 1148, such as an operating system 1150, libraries 1152, frameworks/middleware 1154, applications 1156, and/or a presentation layer 1158. These layers of software architecture executing within the virtual machine 1148 can be the same as corresponding layers previously described or may be different.

Figure 12:
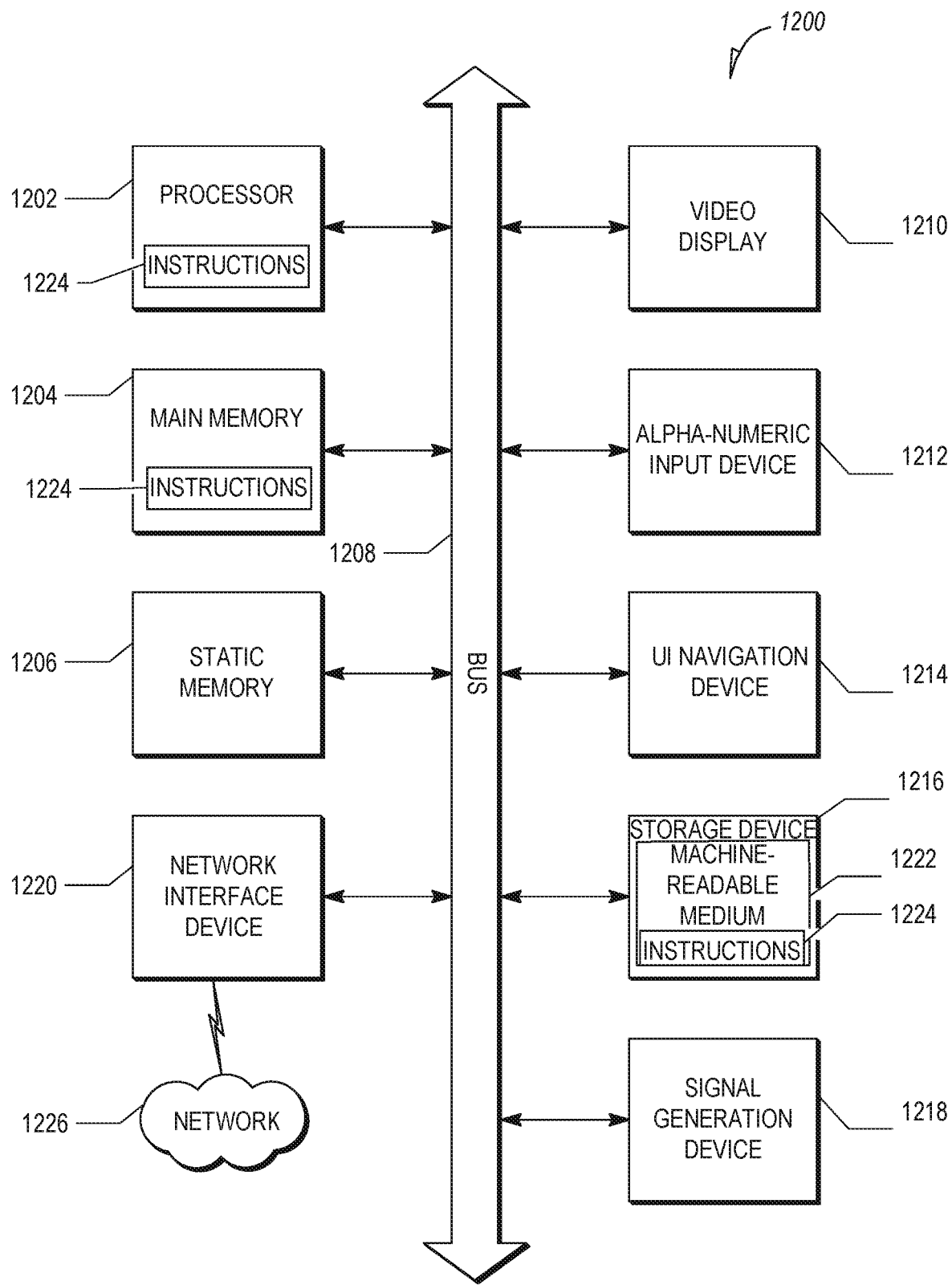
FIG. 12 is a block diagram illustrating a computing device hardware architecture, within which a set or sequence of instructions can be executed to cause a machine to perform examples of any one of the methodologies discussed herein.

FIG. 12 is a block diagram illustrating a computing device hardware architecture 1200, within which a set or sequence of instructions can be executed to cause a machine to perform examples of any one of the methodologies discussed herein. The architecture 1200 may describe, for example, any of the computing devices and/or control circuits described herein. The architecture 1200 may execute the software architecture 1102 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1200 includes a processor unit 1202 comprising at least one processor (e.g., a central processing unit (CPU), a graphics processing unit (GPU), or both, processor cores, compute nodes, etc.). The architecture 1200 may further comprise a main memory 1204 and a static memory 1206, which communicate with each other via a link 1208 (e.g., a bus). The architecture 1200 can further include a video display unit 1210, an alphanumeric input device 1212 (e.g., a keyboard), and a UI navigation device 1214 (e.g., a mouse). In some examples, the video display unit 1210, alphanumeric input device 1212, and UI navigation device 1214 are incorporated into a touchscreen display. The architecture 1200 may additionally include a storage device 1216 (e.g., a drive unit), a signal generation device 1218 (e.g., a speaker), a network interface device 1220, and one or more sensors (not shown), such as a GPS sensor, compass, accelerometer, or other sensor.

In some examples, the processor unit 1202 or another suitable hardware component may support a hardware interrupt. In response to a hardware interrupt, the processor unit 1202 may pause its processing and execute an ISR, for example, as described herein.

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, within the static memory 1206, and/or within the processor unit 1202 during execution thereof by the architecture 1200, with the main memory 1204, the static memory 1206, and the processor unit 1202 also constituting machine-readable media. The instructions 1224 stored at the machine-readable medium 1222 may include, for example, instructions for implementing the software architecture 1102, instructions for executing any of the features described herein, etc.

While the machine-readable medium 1222 is illustrated in an example to be a single medium, the term "machine-readable medium" can include a single medium or multiple media (e.g., a centralized or distributed database, and/or associated caches and servers) that store the one or more instructions 1224. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 1224 can further be transmitted or received over a communications network 1226 using a transmission medium via the network interface device 1220 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 3G, and 5G LTE/LTE-A or WIMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United. States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system of interfacing a computing system to a human user, the system comprising:
at least one processor; and
a machine-readable medium comprising instructions thereon that, when executed by the at least one processor, cause the at least one processor to perform operations comprising:
providing a graphical user interface at a display of a computing device, wherein the graphical user interface comprises:

a holding shape comprising a filled portion having a first filled portion level indicating a first holding balance of an account of the user;

a first expense balance shape indicating a first expense; and a first income source shape indicating a first income source;

determining a level of the first expense balance shape;

moving a first deposit shape from the first income source shape towards the first expense balance shape when the first expense balance shape is at a first level; and moving the first deposit shape from the first income source shape towards the filled portion of the holding shape when the first expense balance shape is at a second level.

2. The system of claim 1, wherein the graphical user interface further comprises a second expense balance shape indicating a second expense.

3. The system of claim 2, where the second expense balance shape is stacked on the first expense balance shape.

4. The system of claim 2, wherein the machine-readable medium further has instructions thereon that, when executed by the at least one processor, cause the at least one processor to perform operations comprising moving a second deposit shape from the first income source shape towards the second expense balance shape.

5. The system of claim 1, wherein the first deposit shape indicates a first deposit to the account from the first income source and the machine-readable medium further has instructions thereon that, when executed by the at least one processor, cause the at least one processor to perform operations comprising resizing the filled portion to a second filled portion level indicating a second holding balance of the account after the first deposit.

6. A method of interfacing a computing system to a human user, the method comprising:

providing a graphical user interface at a display of a computing device, wherein the graphical user interface comprises:

a holding shape comprising a filled portion having a first filled portion level indicating a first holding balance of an account of the user;

a first expense balance shape indicating a first expense; and a first income source shape indicating a first income source;

determining a level of the first expense balance shape;

moving a first deposit shape from the first income source shape the first expense balance shape, moving the first deposit shape from the first income source shape towards the filled portion of e holding shape when the first expense balance shape is at a second level.

7. The method of claim 6, wherein the graphical user interface further comprises a second expense balance shape indicating a second expense.

8. The method of claim 7, wherein the second expense balance shape is stacked on the first expense balance shape.

9. The method of claim 7, wherein the method further comprises moving a second deposit shape from the first income source shape towards the second expense balance shape.

10. The method of claim 6, wherein the first deposit shape indicates a first deposit to the account from the first income source and the method further resizing the filled portion to a second filled portion level indicating a second holding balance of the account after the first deposit.

11. A machine-readable medium having instructions thereon that, when executed by at least one processor, cause the at least one processor to perform operations comprising:

providing a graphical user interface at a display of a computing device, wherein the graphical user interface comprises:

a holding shape comprising a filled portion having a first filled portion level indicating a first holding balance of an account of the user;

a first expense balance shape indicating a first expense; and a first income source shape indicating a first income source;

determining a level of the first expense balance shape;

moving a first deposit shape from the first income source shape towards the first expense balance shape when the first expense balance shape is at a first level; and moving the first deposit shape from the first income source shape towards the filled portion of the holding shape when the first expense balance shape is at a second level.

12. The medium of claim 11, wherein the graphical user interface further comprises a second expense balance shape indicating a second expense.

13. The medium of claim 12, wherein the second expense balance shape is stacked on the first expense balance shape.

14. The medium of claim 12, wherein the machine-readable medium further has instructions thereon that, when executed b the at least one processor, cause the at least one processor to perform operations comprising moving a second deposit shape from the first income source shape towards the second expense balance shape.

15. The medium of claim 11, wherein the first deposit shape indicates a first deposit to the account from the first income source and the operations further include resizing the filled portion to a second filled portion level indicating a second holding balance of the account after the first deposit.

* * * * *

UNITED STATES PATENT AND TRADEMARK OFFICE
CERTIFICATE OF CORRECTION

PATENT NO. : 11,488,262 B1
APPLICATION NO. : 16/988369
DATED : November 1, 2022
INVENTOR(S) : Nichols et al.

It is certified that error appears in the above-identified patent and that said Letters Patent is hereby corrected as shown below:

In the Claims

In Column 15, Line 20, in Claim 3, delete "where" and insert --wherein-- therefor In Column 15, Line 50, in Claim 6, after "shape", insert --towards--

In Column 15, Line 52, in Claim 6, delete "e" and insert --the-- therefor

In Column 16, Line 44, in Claim 14, delete "b" and insert --by-- therefor

Signed and Sealed this
Twenty-seventh Day of December, 2022

Katherine Kelly Vidal
Director of the United States Patent and Trademark Office